(12) United States Patent
Hodinot et al.

(10) Patent No.: US 6,782,692 B2
(45) Date of Patent: Aug. 31, 2004

(54) FUEL METERING UNIT WITH TWO INTEGRATED OUTLET PORTS

(75) Inventors: Laurent Hodinot, Lieusaint (FR); Henry Leclerc, Juvisy sur Orge (FR); Claude Maillard, Vulaines sur Seine (FR); David Maillard, Bois le Roi (FR)

(73) Assignee: Hispano-Suiza, Colombes (FR)

( * ) Notice: Subject to any disclaimer, the term of this patent is extended or adjusted under 35 U.S.C. 154(b) by 18 days.

(21) Appl. No.: 10/152,565

(22) Filed: May 23, 2002

(65) Prior Publication Data

US 2002/0174647 A1 Nov. 28, 2002

(30) Foreign Application Priority Data

May 25, 2001 (FR) .............................. 01 06872

(51) Int. Cl.⁷ .............................................. F02C 7/232
(52) U.S. Cl. .................. 60/39.281; 137/625.48; 251/205
(58) Field of Search ................. 60/39.281; 137/625.48; 251/205

(56) References Cited

U.S. PATENT DOCUMENTS

| | | | |
|---|---|---|---|
| 3,465,778 A | | 9/1969 | Kast |
| 3,508,396 A | * | 4/1970 | Ifield ....................... 60/39.281 |
| 3,774,394 A | | 11/1973 | Criffield |
| 3,826,586 A | * | 7/1974 | Richards ................... 60/39.281 |
| 4,226,365 A | | 10/1980 | Norris et al. |
| 5,579,632 A | * | 12/1996 | Dutka et al. ............. 60/39.281 |
| 5,715,674 A | * | 2/1998 | Reuter et al. ............ 60/39.281 |
| 5,772,182 A | * | 6/1998 | Stambaugh et al. ...... 60/39.281 |

FOREIGN PATENT DOCUMENTS

| | | | |
|---|---|---|---|
| EP | 0 313 503 | | 4/1989 |
| EP | 0 802 311 | | 10/1997 |
| FR | 1595739 | * | 6/1970 |
| FR | 2528495 | * | 12/1983 |

* cited by examiner

*Primary Examiner*—Michael Koczo
(74) *Attorney, Agent, or Firm*—Oblon, Spivak, McClelland, Maier & Neustadt, P.C.

(57) ABSTRACT

In a turbomachine, there is provided a fuel metering unit having a cylindrical outer sleeve containing a distributor cylinder in which a metering piston can be moved linearly under the action of a control element. The cylindrical sleeve has an inlet orifice for admitting fuel under pressure and at least one outlet orifice for injecting fuel into a combustion chamber of the turbomachine, and the metering piston has an annular gap forming a distribution chamber for the fuel admitted via the inlet orifice and delivered via at least one outlet orifice. According to the invention, the distributor cylinder has a plurality of radial feed orifices for admitting fuel into the distribution chamber and at least a first metering orifice and at least a second metering orifice that are separated by a seal disposed at the periphery of the distributor cylinder.

19 Claims, 3 Drawing Sheets

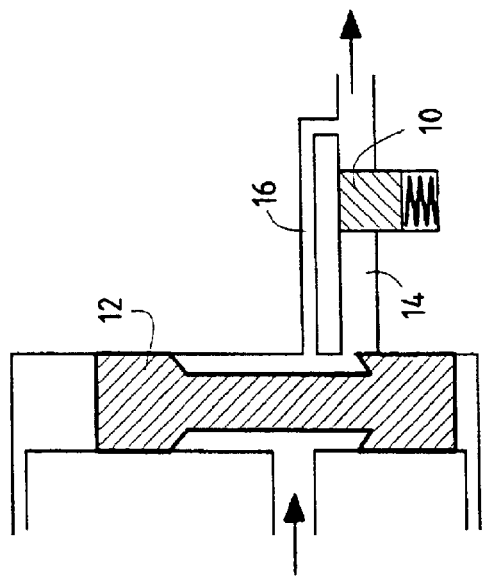
FIG. 6
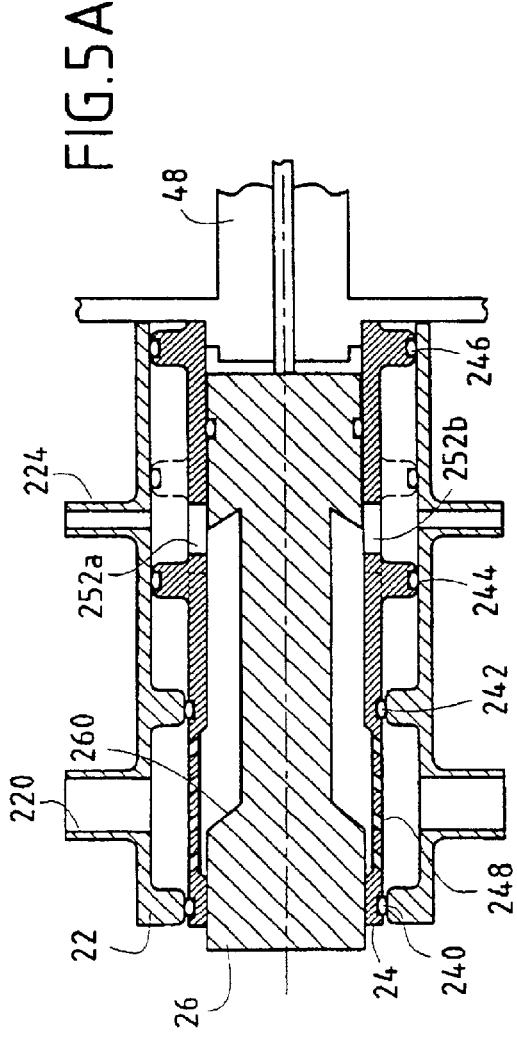
FIG. 5A
FIG. 5B

FUEL METERING UNIT WITH TWO INTEGRATED OUTLET PORTS

FIELD OF THE INVENTION

The present invention relates to the field of fuel injection in turbomachines, and it relates more particularly to a fuel metering unit having two outlets (also known as a dual port unit).

PRIOR ART

In turbomachines, the best performance is obtained when the rotary members are rotating at speeds close to the maximum acceptable limit beyond which there is a danger of losing compressor or turbine blades. Such blade loss is liable to puncture the engine casing with consequences that can go so far as complete destruction of the turbomachine.

Thus, and indeed as recommended by international regulations concerning civil aviation, the use of an overspeed limiter device turns out to be essential to ensure that the speed of these rotary members does not exceed a maximum authorized speed.

Furthermore, for present turbomachines, it must be possible for the pilot of an aircraft to return to a normal operating mode after the overspeed limiter has acted. For this purpose, and as shown in FIG. 6, the overspeed valve 10 of the limiter placed at the outlet from the metering unit 12 must be capable of shutting off only the delivery 14 of fuel at a high flow rate without altering (disturbing) the delivery 16 of fuel at low flow rates and supplying, in particular, the "overspeed" flow rate to which the metering unit feeding the injectors is restricted once the overspeed valve has indeed closed.

An elegant solution to this problem thus consists in implementing a fuel metering unit having two metered fuel outlets. Such a dual-port unit is described, for example, in U.S. Pat. No. 5,771,182. Unfortunately, the linear structure of that unit, also referred to as "tandem" structure, since the metering slots are placed in series one after another, suffers from the severe drawback of lengthening the metering unit very significantly (it is practically twice as long as a conventional unit) and consequently increasing the on-board mass in non-negligible manner.

OBJECT OF AND SUMMARY OF THE INVENTION

The present invention thus seeks to mitigate those drawbacks with a fuel metering unit that is particularly compact, i.e. of minimum size and mass. Another object of the invention is also to propose a unit which does not disturb the metered flow rate below the limited overspeed rate.

These objects are achieved by a fuel metering unit in a turbomachine, the unit comprising an outer cylindrical sleeve having mounted therein a distributor cylinder in which a metering piston can move linearly under the action of a control element, said cylindrical sleeve having an inlet orifice for admitting fuel under pressure and at least one outlet orifice for injecting said fuel into a combustion chamber of said turbomachine, and said metering piston including an annular gap forming a distribution chamber for the fuel admitted via said inlet orifice and delivered via said at least one outlet orifice, wherein said distributor cylinder has a plurality of radial feed orifices for admitting fuel into said distribution chamber from said inlet orifice, and both at least one first metering orifice for expelling the fuel to said first outlet orifice, and at least one second metering orifice for expelling the fuel towards said second outlet orifice, said at least one first and at least one second metering orifices being separated by sealing means placed at the periphery of said distributor cylinder.

With the present metering unit structure that includes a leakproof separating partition, it is possible within a single unit to combine supplying fuel both at high flow rates and at low flow rates. The low flow rate circuit is thus not disturbed in any way by the overspeed valve and the size of the unit is particularly small compared with prior art units having two metering units placed one after the other.

In an advantageous embodiment, said first metering orifices are two in number and they are placed diametrically opposite each other. Preferably, said first metering orifices present a flow section that is exponential. Similarly, and advantageously, said second metering orifices are two in number and they are disposed diametrically opposite each other. Preferably, said second metering orifices present a flow section that is exponential.

Said at least one first and at least one second metering orifices are placed in a common transverse plane and they are offset in pairs by 90°, so as to ensure fuel flow continuity towards said combustion chamber during displacement of said metering piston. Said first metering orifices present a width a at their downstream ends that is equal to a width b of said second metering orifices at their upstream ends.

In a first embodiment, said sealing means comprise an elastomer gasket mounted in a groove of a separating partition extending from the outer periphery of said distributor cylinder and separating said first metering orifice(s) from said second metering orifice(s). Alternatively, said sealing means comprise an elastomer gasket mounted in a groove of a separation well disposed around each of said metering orifices so as to isolate them from said second metering orifices.

BRIEF DESCRIPTION OF THE DRAWING

The characteristics and advantages of the present invention appear better from the following description given by way of non-limiting indication and with reference to the accompanying drawings, in which:

FIGS. 5A and 5B are longitudinal section views respectively on planes VA and VB of FIG. 1, corresponding to two distinct positions of the two-outlet metering unit of FIG. 1; and FIG. 6 is a highly diagrammatic fragmentary view of a fuel injection system for a turbomachine provided with an overspeed limiter.

DETAILED DESCRIPTION OF A PREFERRED EMBODIMENT

Figure 1:
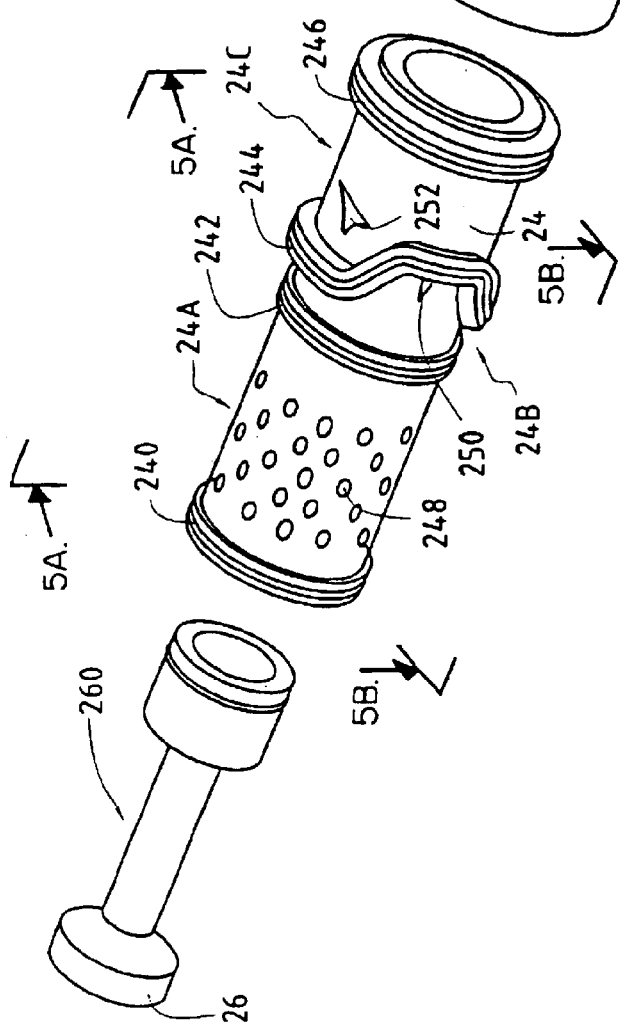
FIG. 1 is a perspective view of a first embodiment of a two-outlet metering unit of the invention.

FIG. 1 is an exploded perspective view of a fuel metering unit having two outlet orifices implemented in a conventional fuel injection system for an aircraft turbomachine. This fuel metering unit is the central element of the injection system and controls the rate at which fuel flows between a high pressure pump for pressurizing fuel taken from a fuel tank and a circuit for injecting fuel into the combustion chamber of the turbomachine.

In accordance with the invention, the metering unit 20 is made up of three concentric portions comprising a cylindrical outer sleeve 22 having mounted therein a likewise cylindrical bushing 24 acting as a distributor and itself containing a piston 26 capable of moving linearly in a continuous manner between two extreme positions.

The cylindrical sleeve 22 has an inlet orifice 220 for connection to a high pressure pump and through which the fuel for metering is admitted, and two outlet orifices 222, 224 for connection to the injection circuit and via which fuel is injected into the combustion chamber of the turbomachine, one of the orifices 222 serving to inject fuel at low flow rates (in particular a limited flow rate when in an overspeed situation) and the other orifice 224 serving to deliver fuel at high flow rates (normal operation).

The piston 26 has an annular gap 260 forming a distribution chamber for metering the fuel which is admitted via the inlet orifice 220 and is delivered via the outlet orifice 222 and 224. The piston is preferably moved within the bushing in a conventional manner by an electromagnetic element 28 connected to one end of the piston and controlled by an electronic circuit for controlling the turbomachine (not shown).

The distributor cylinder (bushing 24) disposed between the cylindrical sleeve and the piston has sealing means at its outer periphery formed by four annular gaskets 240, 242, 244, 246, including one at each end, thereby defining three distinct zones 24A, 24B, and 24C for distributing fuel. The first distribution zone 24A is for co-operating with the inlet orifice 220 to receive the fuel for metering, the second zone 24B is for co-operating with the first outlet orifice 222 for injecting fuel at a low flow rate, and the third zone 24C is for co-operating with the second outlet orifice 224 to inject fuel at a high flow rate. This admission and this dual injection of fuel into the turbomachine are performed via various orifices formed radially through the wall of the distributor cylinder.

In the first zone 24A, defined by the first and second gaskets 240 and 242, the distributor cylinder has a plurality of feed orifices 248 passing radially through its periphery and enabling the fuel feed flow coming from the single inlet orifice 220 to be split up and distributed uniformly within the metering unit. In the second zone 24B, defined between the second and third annular gaskets 242 and 244, the distributor cylinder has at least one and preferably two first metering orifices 250a and 250b disposed at 180° to each other (diametrically opposite) serving to define a fuel flow relationship for low flow rates. The flow section through the first metering orifices is advantageously exponential. Finally, in the third zone 24C defined between the third and fourth annular gaskets 244 and 246, the distributor cylinder has at least one and preferably two second metering orifices 252a and 252b likewise disposed at 180° to each other (diametrically opposite), but offset by 90° from the first metering orifices, and serving to define a fuel flow relationship at high flow rates. The flow passage through these second metering orifices is also advantageously exponential.

Figure 2:
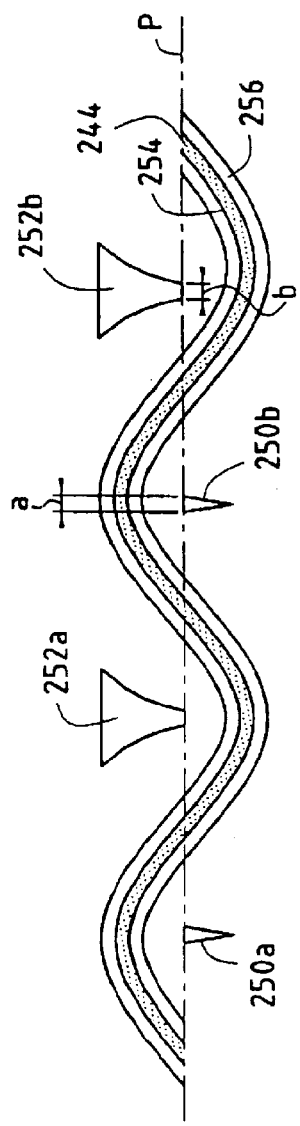
FIG. 2 is a developed view level with the metering orifices of the two-outlet unit of FIG. 1.

In order to ensure smooth continuity of flow between the low and the high flow rates, the first and second metering orifices lie in a common transverse plane P, as shown in FIG. 2, which is a plane developed from the distributor cylinder in the vicinity of said orifices, and the width a of the low flow rate orifice (at its downstream end in the advance direction of the piston) is equal to the width b of the high flow rate orifice (at its upstream end in the advance direction of the piston). It should be observed in particular that the third annular gasket 244 has an undulating configuration to provide fully leaktight partitioning between the orifices that define low and high flow rates. This third gasket is preferably an elastomer gasket hot-bonded in a groove 254 of a separating partition 256 extending around the outer periphery of the distributor cylinder and zigzagging between the metering orifices. Nevertheless, it would also be possible to use an elastomer gasket previously cooled in the groove in order to ensure that it is rigid during hot assembly.

Figure 3:
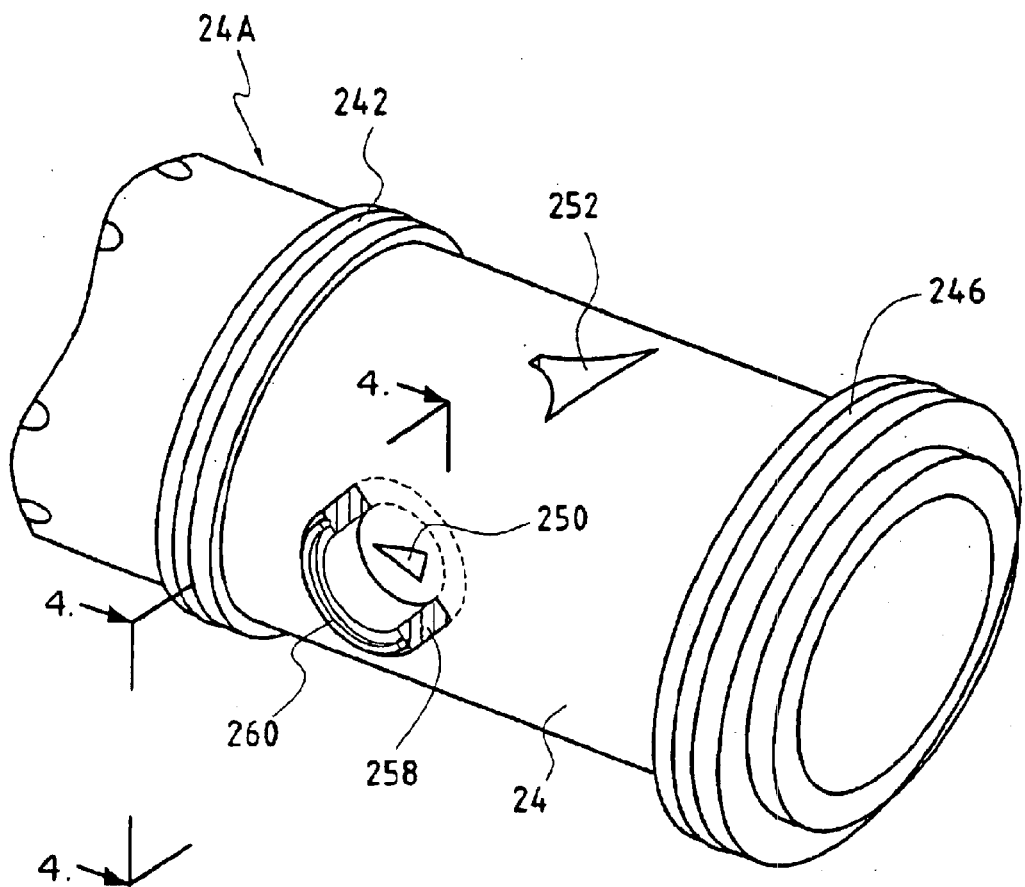
FIG. 3 is a perspective view of a second embodiment of a portion of the two-outlet metering unit of the invention.
Figure 4:
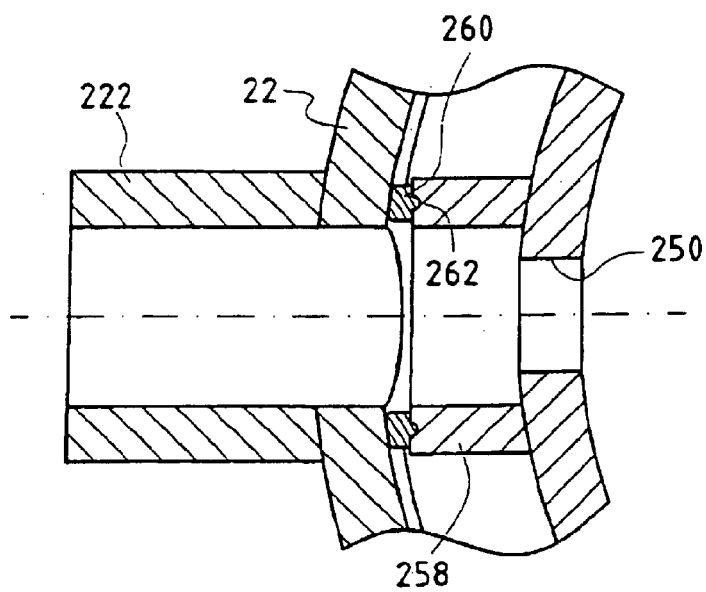
FIG. 4 is a section view through a metering orifice of the two-outlet metering unit of FIG. 3.

This sealing provided by an undulating gasket is not the only configuration that can be devised for providing leakproof separation between the metering orifices for high and low flow rates, and a configuration relying on making wells around each low flow rate metering orifice (or indeed around each high flow rate metering orifice) and associating each well with a circular gasket is a possible alternative. FIGS. 3 and 4 show the bushing 24 in perspective and in fragmentary section for a second embodiment. Elements that are identical to those of the above embodiments are given the same references.

In this second embodiment, partitioning between low and high flow rates is provided by forming an isolating well 258 around each low flow rate metering orifice 250a, 250b, which well extends from the outside surface of the bushing 24 to the vicinity of the inside surface of the outer sleeve 22, and has a gasket 260 mounted thereon. As before, the gasket is preferably an elastomer gasket which, in order to make it easier to mount, can be hot-bonded in a groove 262 in the end surface of the well or can be cooled in said groove in order to stiffen it prior to assembly.

The operation of the metering unit of the invention is described below with reference to FIGS. 5A and 5B which relates more specifically to the embodiment of FIG. 1 (the embodiment of FIG. 3 naturally operates in identical manner). FIG. 5A shows the position of the piston in normal operation. Engine speed is then a cruising speed which is faster than idling speed. The fuel passing via the feed orifices 248 is injected into the combustion chamber via all of the metering orifices 250, 252. When the speed of rotation of the turbomachine exceeds a predefined maximum authorized speed, the feed of fuel to the combustion chamber is restricted to a predetermined fixed flow rate referred to as the "overspeed" flow rate Qsv, with this being done by closing the overspeed valve downstream from the second outlet orifice 224 relating to high flow rates. The position of the piston 26 remains unchanged. The same applies when the speed of rotation drops back to below the maximum authorized speed. However, if the pilot using the throttle control then issues an instruction for the engine to idle (which instruction cannot be accepted by the turbomachine control circuit unless the turbomachine has returned to proper operation), then the fuel feed is reduced to a rate corresponding to idling, which is slower than the speed to which the engine is restricted when being fed at the overspeed rate, thereby authorizing a subsequent return to normal operation. Under such circumstances, and as shown in FIG. 5B, the piston 26 is moved so as to shut off the high flow rate metering orifices 252 completely together with a portion only of the low flow rate metering orifices 250, thus enabling the injection circuit to be fed at a limited rate.

What is claimed is:

1. A fuel metering unit in a turbomachine, the unit comprising an outer cylindrical sleeve having mounted therein a distributor cylinder in which a metering piston can move linearly under the action of a control element, said cylindrical sleeve having an inlet orifice for admitting fuel under pressure and at least one first outlet orifice and one second outlet orifice for injecting said fuel into a combustion chamber of said turbomachine, and said metering piston including an annular gap forming a distribution chamber for the fuel admitted via said inlet orifice and delivered via said at least one outlet orifice, wherein said distributor cylinder has a plurality of radial feed orifices for admitting fuel into said distribution chamber from said inlet orifice, and both at least one first metering orifice for expelling the fuel to said first outlet orifice, and at least one second metering orifice for expelling the fuel towards said second outlet orifice, said at least one first and at least one second metering orifices being separated by sealing means placed at the periphery of said distributor cylinder and being placed in a common transverse plane so as to ensure fuel flow continuity towards said combustion chamber during displacement of said metering piston.

2. A unit according to claim 1, comprising two first metering orifices placed diametrically opposite each other.

3. A unit according to claim 2, wherein a flow section of each of said first metering orifices varies exponentially.

4. A unit according to claim 1, comprising two second metering orifices disposed diametrically opposite each other.

5. A unit according to claim 4, wherein a flow section of each of said second metering orifices varies exponentially.

6. A unit according to claim 1, wherein said at least one first metering orifice has a width at a downstream end thereof equal to a width of said at least one second metering orifice at an upstream end thereof.

7. A unit according to claim 1, wherein said first and second metering orifices are offset in pairs by 90°0.

8. A unit according to claim 1, wherein said sealing means comprise an elastomer gasket mounted in a groove of a separating partition extending from the outer periphery of said distributor cylinder and separating said at least first metering orifice from said at least second metering orifice.

9. A unit according to claim 1, wherein said sealing means comprise an elastomer gasket mounted in a groove of a separation well disposed around each of said metering orifices so as to isolate them from said second metering orifices.

10. A fuel metering unit in a turbomachine, the unit comprising:

an outer cylindrical sleeve having an inlet orifice, a first fuel outlet, and a second fuel outlet;

a distributor cylinder mounted inside said outer cylindrical sleeve so as to form a distribution chamber, said distributor cylinder further comprising a plurality of radial feed orifices in communication with said distribution chamber, and a first metering orifice and a second metering orifice in communication with said first and second fuel outlets, respectively, said first and second metering orifices being in communication with said distribution chamber;

a metering piston configured to translate inside said distributor cylinder and to further define said distribution chamber; and an undulating seal disposed on an external surface of said distribution cylinder and between said first metering orifice and said second metering orifice.

11. A metering unit according to claim 10, wherein said first and second metering orifices are disposed on said distributor cylinder in a common transverse plane.

12. A metering unit according to claim 10, wherein said first and second metering orifices comprise exponentially varying flow cross sections.

13. A metering unit according to claim 10, wherein said undulating seal is configured to provide leak tight partitioning between said first and second metering orifices.

14. A metering unit according to claim 10, wherein a width of an outlet of said first metering orifice is equal to a width of an inlet of said second metering orifice.

15. A unit according to claim 10, wherein said undulating seal is an elastomer gasket, said gasket being disposed in a groove of a separating partition extending around an outer periphery of said distributor cylinder.

16. A fuel metering unit in a turbomachine, the unit comprising:

an outer cylindrical sleeve having an inlet orifice, a first fuel outlet, and a second fuel outlet;

a distributor cylinder mounted inside said outer cylindrical sleeve so as to form a distribution chamber, said distributor cylinder further comprising a plurality of radial feed orifices in communication with said distribution chamber, and a first metering orifice and a second metering orifice in communication with said first and second fuel outlets, respectively, said first and second metering orifices being in communication with said distribution chamber; and a metering piston configured to translate inside said distributor cylinder and to further define said distribution chamber, wherein said first and said second metering orifices are positioned with respect to each other in a common plane transverse to said distribution cylinder.

17. A unit according to claim 16, further comprising isolating wells disposed around each one of said first and second metering orifices.

18. A unit according to claim 17, wherein each one of said wells extends from an outside surface of said distribution cylinder to a vicinity of an inside surface of said outer cylindrical sleeve, said unit further comprising a plurality of sealing gaskets, each one of said sealing gasket being mounted on each one of said wells against said internal surface of said outer cylindrical sleeve.

19. A unit according to claim 18, wherein each of said sealing gaskets is an elastomer gasket.

* * * * *